United States Patent
Revely, III

(10) Patent No.: US 10,478,014 B2
(45) Date of Patent: Nov. 19, 2019

(54) SEMI AUTOMATIC COLLAPSIBLE CHAFER WITH HEATER SUPPORTS

(71) Applicant: Bernet Ulysses Revely, III, Lynchburg, VA (US)

(72) Inventor: Bernet Ulysses Revely, III, Lynchburg, VA (US)

( * ) Notice: Subject to any disclaimer, the term of this patent is extended or adjusted under 35 U.S.C. 154(b) by 0 days.

(21) Appl. No.: 15/004,945

(22) Filed: Jan. 24, 2016

(65) Prior Publication Data
US 2016/0213195 A1 Jul. 28, 2016

Related U.S. Application Data

(60) Provisional application No. 62/107,752, filed on Jan. 26, 2015.

(51) Int. Cl.
*A47J 36/24* (2006.01)
*A47B 43/00* (2006.01)

(52) U.S. Cl.
CPC ............... *A47J 36/24* (2013.01); *A47B 43/00* (2013.01)

(58) Field of Classification Search
CPC .. A47J 36/24; A47J 36/36; A47J 36/30; A47J 39/02; A47J 36/34; A47B 43/00; A47F 5/10; D06F 57/08
USPC .... 211/85.4, 195, 201, 200, 202, 41.5, 41.6; 248/150, 165; 126/9 A, 9 R; D7/402, D7/403, 355, 365, 366; 99/449, 483, 339
See application file for complete search history.

(56) References Cited

U.S. PATENT DOCUMENTS

| | | | | |
|---|---|---|---|---|
| 660,290 A | * | 10/1900 | Corbin | A47F 5/13 211/175 |
| 710,790 A | * | 10/1902 | Magerhans | A47G 25/12 211/200 |
| 1,266,588 A | * | 5/1918 | Hanson | A47J 37/0763 126/29 |
| 1,309,049 A | * | 7/1919 | Syrett | A47B 3/0815 126/30 |
| 1,462,615 A | * | 7/1923 | Noble | A47G 25/12 108/31 |
| 1,612,937 A | * | 1/1927 | Mitchell | A47F 5/13 108/59 |
| 2,985,316 A | * | 5/1961 | Ruhnke | A47F 5/13 182/152 |
| 3,025,849 A | * | 3/1962 | Zimmerman | F24C 1/16 126/25 A |
| 3,361,126 A | * | 1/1968 | Bloomfield | A47J 36/24 126/261 |
| 3,722,702 A | * | 3/1973 | Marker, Jr. | A47F 5/13 108/115 |

(Continued)

*Primary Examiner* — Jennifer E. Novosad

(57) ABSTRACT

The semi-automatic collapsible chafer system is a multi-angle framework with a plurality of locking joints arranged at the corners thereof and a plurality of interlocking rail pole assemblies. The frame is designed with at least one well to accommodate one or more industry standard chafing pans with a unique dual canned heat compartment for each well. The semi-automatic collapsible chafer system quickly opens to be used as a complete food service station then quickly retracts for easy storage and mobility. The complete assembly utilizes these joints to collapse horizontally and vertically in the X, Y, and Z axis. The present invention is the only fully collapsible/erectable chafer with heater supports and built in safety features.

1 Claim, 4 Drawing Sheets

(56) References Cited

U.S. PATENT DOCUMENTS

| | | | | |
|---|---|---|---|---|
| 4,953,878 A * | 9/1990 | Sbragia | B62B 3/027 | 280/30 |
| 5,048,857 A * | 9/1991 | Stevens | B62B 3/10 | 108/167 |
| 5,154,441 A * | 10/1992 | White | A47B 31/04 | 108/120 |
| 5,287,800 A * | 2/1994 | Orednick | A47F 3/14 | 126/9 R |
| 5,293,859 A * | 3/1994 | Lisker | A47J 37/0768 | 126/25 A |
| 5,467,697 A * | 11/1995 | Hunziker | A47J 27/10 | 126/33 |
| 5,517,903 A * | 5/1996 | Kaufman | A47J 27/10 | 126/39 B |
| 5,593,046 A * | 1/1997 | Katsuura | H05K 7/1424 | 211/162 |
| 5,775,209 A * | 7/1998 | Tiemann | F24C 15/16 | 211/181.1 |
| 5,784,972 A * | 7/1998 | Emalfarb | A47G 7/041 | 108/156 |
| 5,823,100 A * | 10/1998 | Wienhold | A21B 3/155 | 108/91 |
| 6,234,068 B1 * | 5/2001 | Sherman | A47J 36/2477 | 126/33 |
| 6,443,481 B1 * | 9/2002 | Stravitz | A47B 31/04 | 211/201 |
| 6,955,327 B1 * | 10/2005 | Skvorecz | A47J 36/34 | 126/40 |
| 7,100,877 B2 * | 9/2006 | Bourke | A47B 37/04 | 108/118 |
| 7,175,033 B1 * | 2/2007 | Riopel | A47J 36/24 | 211/132.1 |
| D626,377 S * | 11/2010 | Contreras | D7/355 | |
| 8,079,302 B2 * | 12/2011 | Giangrasso | A47J 27/122 | 126/275 R |
| 8,381,664 B2 * | 2/2013 | Prendergast | A47B 3/00 | 108/115 |
| 2002/0020304 A1 * | 2/2002 | Reynolds | A47J 36/24 | 99/339 |
| 2005/0076795 A1 * | 4/2005 | Riddle | A47J 36/24 | 99/483 |
| 2005/0167381 A1 * | 8/2005 | Fariello | A47J 36/2405 | 211/181.1 |
| 2006/0138066 A1 * | 6/2006 | Hung | A47B 47/005 | 211/189 |
| 2011/0017079 A1 * | 1/2011 | Wall | A47J 36/26 | 99/449 |
| 2014/0069284 A1 * | 3/2014 | Zhou | A47J 36/2405 | 99/483 |
| 2014/0305955 A1 * | 10/2014 | Lee | A47J 36/36 | 220/739 |
| 2015/0108286 A1 * | 4/2015 | Barnes | A47J 43/287 | 248/37.6 |
| 2016/0213195 A1 * | 7/2016 | Revely, III | A47B 43/00 | |

\* cited by examiner

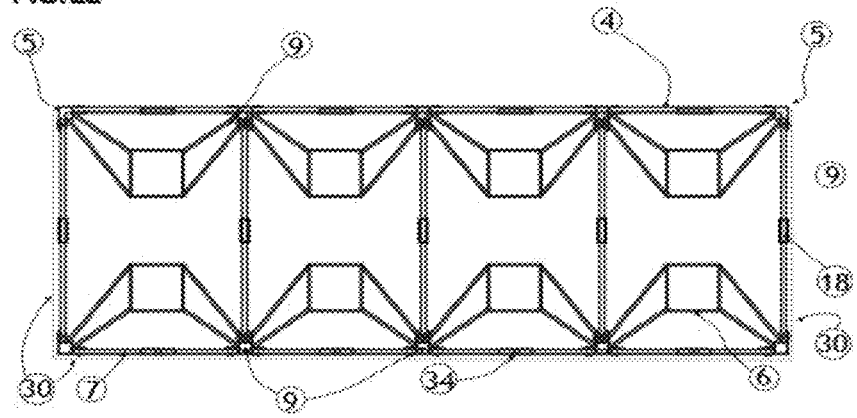
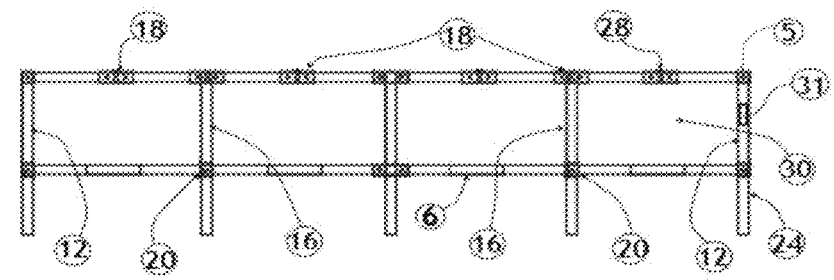
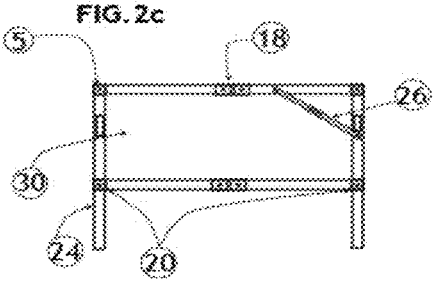

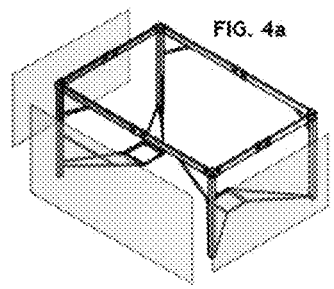
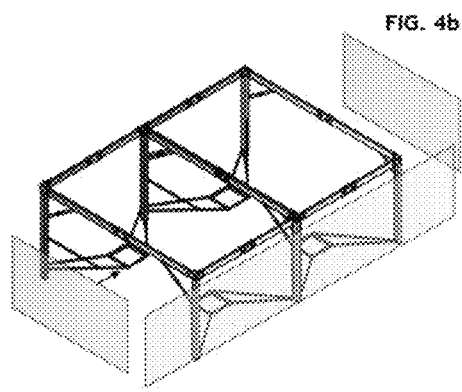
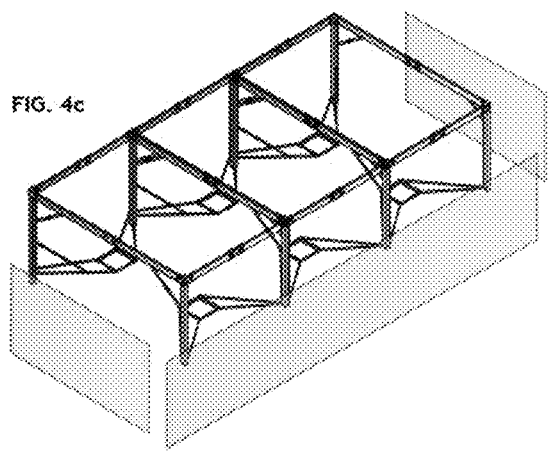
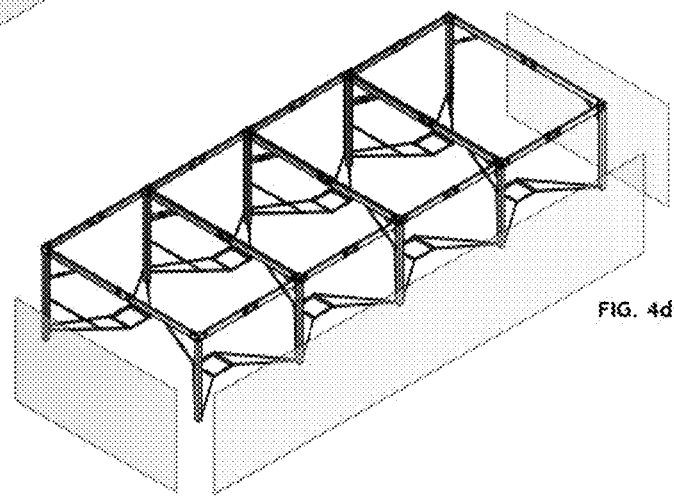

SEMI AUTOMATIC COLLAPSIBLE CHAFER WITH HEATER SUPPORTS

CROSS-REFERENCE TO RELATED APPLICATION

This application is a continuation of U.S. patent application No. REF U.S. 62/107,752, filed Jan. 26, 2015

FIELD OF THE INVENTION

The invention relates to the field of a food service apparatus for supporting, heating, serving, and displaying food, and in particular, to a portable, semi-automatically erectable chafing system which is vertically and horizontally collapsible for compact storage.

BACKGROUND OF THE INVENTION

Food servicers are utilizing more innovative ways of distributing their fantastic food products. Current methods of serving hot foods have limited capabilities. From catering, to farmer's markets, to food trucks, street vending and tailgating, have proven to be viable means to distribute food. The semi-automatic collapsible chafer system will give eager entrepreneurs and families an easy way to set up a full featured mobile food service center with built-in safety measures.

DESCRIPTION OF BACKGROUND ART

Food catering services typically serve the prepared foods from a buffet line from a plurality of chafing dishes or trays which are typically comprised of a stand for holding a double-boiler pan and for positioning a heat source under the double-boiler pan. U.S. Pat. No. 5,517,903 to Kaufman discloses a portable chafing dish rack having a collapsible stand comprised of four rigid plates which are coupled together by flatly folding piano hinges. Upon removal of one hinge pin, the stand will collapse into a compact flat package which is easy to store. The pin, however, is separate from the collapsed stand and is therefore subject to being misplaced or discarded. US invention 20140069284, presents a chafer frame with foldable legs, comprising a frame and an alcohol burner support, wherein the alcohol burner support is arranged below the frame. This idea still leaves the consumer with a somewhat bulky and cumbersome device, especially when multiple units are needed.

U.S. Pat. No. 5,467,697 to Hunziker discloses a foldable chafing rack having a top frame supported by legs which can pivot up into the top frame. Rings are cantilevered to the frame to hold the heat source such that they can be swung under or away from the frame. This device, however, has no stabilizing element for the legs and should one leg be pushed, the device will collapse or topple, possibly causing the spill of burning fuel, steaming water, or hot food. U.S. Pat. No. 5,287,800 to Orednick discloses a food display system comprised of a plurality of bent wires and plastic legs which can be assembled on site. This device suffers from the same disadvantages as the U.S. Pat. No. 5,517,903 to Kaufman, addressed above, in that attention needs to be paid to keeping track of the multiplicity of pieces. U.S. Pat. Nos. 5,467,697, 5,287,800 and 5,517,903 are examples of such chafing dish assemblies which, advantageous as they are in serving heated food, suffer from being difficult to assemble and disassemble at a particular location. Chafers with multiple parts have to be assembled and disassembled which detract from the ability to set up and remove a food serving system rapidly and efficiently. U.S. Pat. No. 6,234,068 to Sherman, discloses a collapsible chafing dish stand having unsecured legs, implicating the same dangers due to an unintentional collapse of one or both sides of the device. U.S. Pat. No. 6,234,068 B1 is a Food Service tray support that folds flat vertically but lacks stability and strength.

Food service carts generally are designed for service convenience and mobility so that they can be used in different locations and for a wide range of service functions. Some types of carts generally relates to food service carts, are an integrated cart system which is vertically collapsible. U.S. Pat. No. 5,048,857 issued to Stevens, features a vertically collapsible food service cart system which is vertically collapsible for compact storage, however, its bulk and weight limits its mobility. Therefore, it is a principal object of this invention to provide an integrated food service system which instantaneously opens and locks in place. Which is designed to hold chafer dish assemblies while erect and instantaneously collapses horizontally and vertically for condition for storage. It is a further object of the invention to provide an integrated food service cart system in which the chafer dish assemblies have complementary features such as soup kettles, griddles, sanitizing basins, and thermometers. A particular object is to provide a food service systems that is light weight easy to erect and collapse while providing safety measures which overcome the previous problems.

OBJECTS OF THE INVENTION

Accordingly, it is a general object of this invention to quickly set up an integrated food service system, safely deliver food, and to quickly collapse for removal of the food service system.

SUMMARY OF THE INVENTION

The invention aims to overcome shortcomings of the existing chafer frame. It is the only apparatus that is collapsible both horizontally and vertically with the ability to hold chafing pans. Ordinary chafing frames are, too bulky and have high cost. With the totally collapsibility of this design, it will simplify the manufacturing process, reduced size, and lower cost. So-called pop-up structures of this kind are known in various forms and consist essentially of a number of hinged attached side members. The principles of construction utilized in the present invention thus to provide a structure which forms service wells designed to safely hot hold for in industry standard chafing pans.

The invention comprises an integrated food service table system having a frame which is a quickly erectable, quickly collapsible, self-supporting portable structures. This pop-up structure semi-automatically erects horizontally and vertically in the X, Y, and Z axis. The structure has been configured to form a food service station and consist essentially of a number of hinged attached side members which lock in place for stability. Each having at least four rectangle rails defining a space for holding a chafer pan therein, a support member pivotally mounted which extends below said chafer-pan holding space, wherein said support member has a retaining portion for holding two chafer heating element per well for applying heat to a chafer pan held in said space when said frame(s) are in the horizontal service position.

BRIEF DESCRIPTION OF THE DRAWINGS

FIG. 2a is the top view of a four-well expanded food chafing service system FIG. 2b is the front view four-well expanded food chafing service system FIG. 2c is the right side view four-well expanded food chafing service system FIG. 4a is a perspective view of a one unit system with wind guard FIG. 4b is a perspective view of a two unit system with wind guard FIG. 4c is a perspective view of a three unit system with wind guard FIG. 4d is a perspective view of a four unit system with wind guard

DETAILED DESCRIPTION OF THE INVENTION

This invention relates to the improvement and safety of food warming with an apparatus which is portable, extensible, and collapsible and has for its principal object of a food service system which may be quickly assembled and disassembled, which is adjustable in height. Another object of my invention, is to construct the frame 4 of a light weight material for lower manufacturing cost.

A still further object of my invention is to provide a heating system which is suitable for indoor and outdoor events with decorative wind guards.

Figure 1:
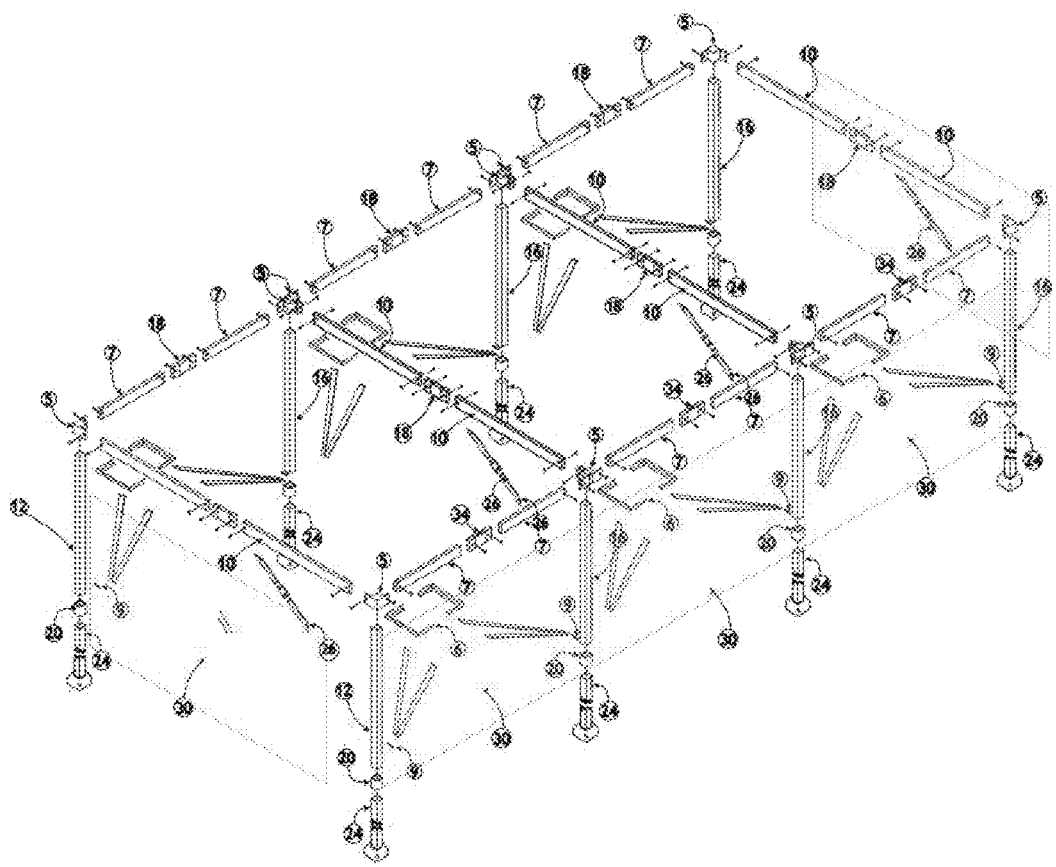
FIG. 1 is an assembly drawing of a three-well, fully expanded food chafing service system
Figure 3A:
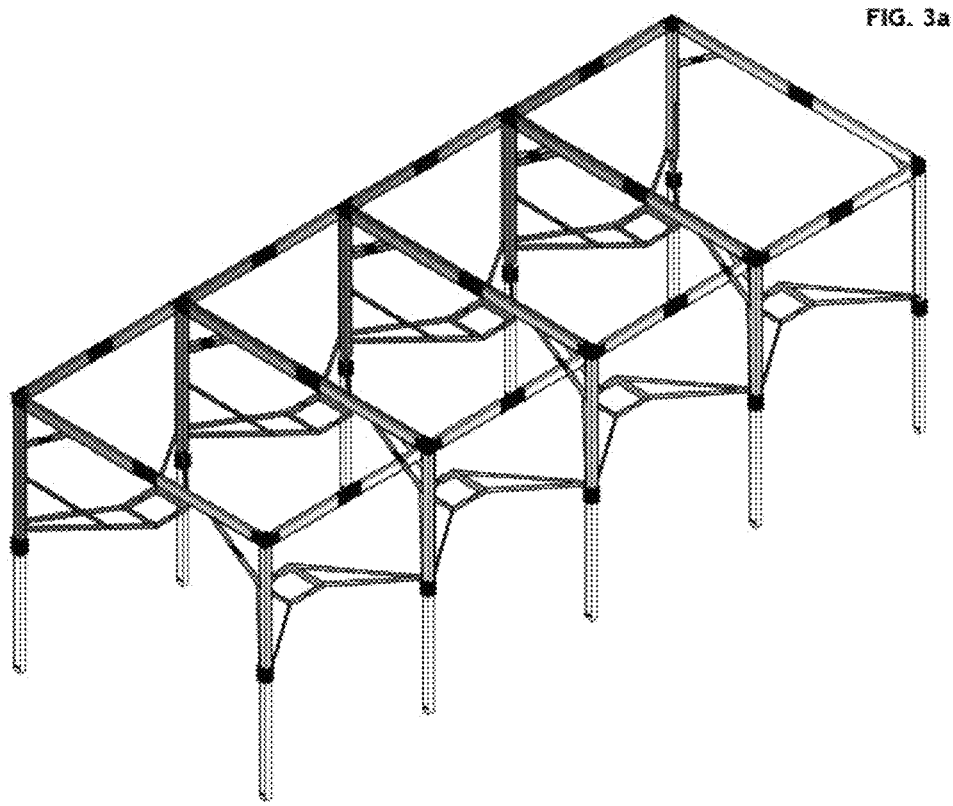
FIG. 3a is a working drawing of an expanded four well unit
Figure 3B:
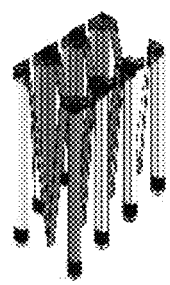
FIG. 3b is a collapsed drawing of an expanded four well unit

Referring now to the drawings, FIG. 1 identifies a well foodservice system 4 according to this invention for supporting a chafing pan(s) and a pair of burner supports 6. The tray 4 is made up of two long frame arms 10 and two short frame arms 7, to form a frame. Each arm, 7 and 10 are joined by a truss connector 18 and held in place by a special hinge joint 5, is typically constituted of aluminum for heat transfer and strength. Each burner support 6 is a thin walled tray, held by a special hinge 9 typically made of aluminum for heat transfer.

Each outer leg support 12 has a 2 prong corner lock 5 to add frame stability. The inner leg supports 16, utilize a four prong peak slider.

Each frame 4 has a series of truss connector locks 18 for strength and collapsibility when use is over.

The system 4 includes a port 28 which is used to house a thermometer

Outer leg support 12 contain a button slider 20 with inner leg and foot press 24

Inner leg support 16 also contain a button slider 20 with interior leg and foot press 24

The diagonal brace members 26 connects to the frame arm 7 and the outer leg 12 which locks in place when fully erect for added stability.

The optional wind guards 30 attach magnetically 31 and help to protect the heating source resulting in a more constant temperature for food safety and provides for customization.

34 is a temperature probe port used to hold a thermometer in place.

With the use of locking connectors and braces, the semi-automatic collapsible chafer system quickly opens and locks in place to be used as a complete food multi-service food station then quickly retracts for easy storage and mobility. The complete assembly holds multiple commercial chafing pans. The present invention is the only fully collapsible/erectable chafer with heater supports and built in safety features.

PATENT CITATIONS

| Cited Patent | Filing date | Publication date | Applicant | Title |
|---|---|---|---|---|
| U.S. Pat. No. 5,287,800 * | 20 Aug. 1990 | 22 Feb. 1994 | Orednick J Paul | Caterer food display system |
| U.S. Pat. No. 5,467,697 * | 14 Oct. 1994 | 21 Nov. 1995 | Hunziker; Hugo | Disposable chafing dish |
| U.S. Pat. No. 5,517,903 * | 3 Nov. 1994 | 21 May 1996 | Kaufman; Kenneth L. | Collapsible and portable chafing dish |
| U.S. Pat. No. 6,234,068 * | 7 Sep. 2000 | 22 May 2 | Aleksandr Sherman | food Service tray support |
| US20140069284 * | 1 Aug. 2011 | 13 March 13 | Junjie Zhou | Chafer frame with foldable legs |
| U.S. Pat. No. 5,048,857 * | 26 Oct. 1989 | 17 Sept 17 | Kenneth Stevens | food Service tray support |

What is claimed as new and desired to be protected by Letters Patent is set forth in the appended claims:

1. A collapsible chafing dish system comprising:
   at least one rectangular frame having a first horizontally extending arm, a second horizontally extending arm, a third horizontally extending arm and a fourth horizontally extending arm, whereby the first and third arms are longer than the second and fourth arms,
   the first arm comprises a first arm segment and a second arm segment, the second arm comprises a third and fourth arm segment, the third arm comprises a fifth and sixth arm segment, and the fourth arm comprises a seventh and eight arm segment, whereby each of the arm segments comprises a first end and a second end,
   the second end of the first arm segment being joined to the first end of the second arm segment by a first truss connector, the second end of the third arm segment being joined to the first end of the fourth arm segment by a second truss connector, the second end of the fifth arm segment being joined to the first end of the sixth arm segment by a third truss connector, the second end of the seventh arm segment being joined to the first end of the eighth arm segment by a fourth truss connector,
   the first end of the first arm segment being joined to the first end of the eight arm segment by a first hinge, the second end of the second arm segment being joined to the first end of the third arm segment by a second hinge, the second end of the fifth arm segment being joined to the second end of the fourth arm segment by a third hinge, and the first end of the sixth arm segment being joined to the second end of the seventh arm segment by a fourth hinge, a hole is located within the second hinge which is adapted to support a thermometer, a first, second third, and fourth leg member, each of the leg members being comprised of an inner and outer leg element, whereby each outer leg element comprises a first end and a second end, and each of the inner leg elements comprises a first end and a second end, whereby the first end of each inner leg element is inserted within the second end of the respective outer leg segment, such that the leg segments can be used to adjust a height of the system relative to a supporting surface, the first end of the outer leg segment of the first leg member being joined to the first hinge, the first end of the outer leg segment of the second leg member being joined to the second hinge, the first end of the outer leg segment of the third leg member being joined to the third hinge, and the first end of the outer leg segment of the fourth leg member being joined to the fourth hinge, the second end of each inner member comprising a foot press with a bottom end adapted to rest on the supporting surface, a chafing dish holding area defined within the rectangular frame and the leg members, whereby a chafing dish can be placed between the horizontally extending arms, a first diagonal brace member is connected between the first arm segment and the outer leg segment of the first leg member, a second diagonal brace member is connected between the second arm segment and the outer leg segment of the second leg member, a third diagonal brace member is connected between the fifth arm segment and the outer leg segment of the third leg member, and a fourth diagonal brace member is connected between the sixth arm segment and the outer leg segment of the fourth leg member, at least one burner support adapted to hold a heating source which supplies heat to the chafing dish, whereby the at least one burner support is connected to the first and fourth leg members or the second and third leg members, wherein the chafing dish system can be moved between a collapsed position and an expanded position, such that when in the expanded position a chafing dish can be placed with the chafing dish holding area, and a horizontal plane is defined along and between the arms, and when in the collapsed position, the arm segments are pivoted about the truss connectors and hinges, to move the second leg member adjacent the first leg member and the third leg member adjacent the fourth leg member, and whereby the truss connectors are located below the horizontal plane.

* * * * *